United States Patent [19]

Spratt et al.

[11] Patent Number: 4,990,348

[45] Date of Patent: Feb. 5, 1991

[54] MICROWAVE-PUFFABLE HALF-PRODUCTS OF STARCH-CONTAINING MATERIAL AND THEIR PRODUCTION PROCESS

[76] Inventors: Winston A. Spratt, R.R. #1, Manotick, Ontario, Canada, K0A 2N0; David Paton, 1150 Bordeau Grove, Orleans, Ontario, Canada, K1C 2M7; Gordon E. Timbers, 5 Dallas Place, Nepean, Ontario, Canada, K2G 3E2

[21] Appl. No.: 253,551

[22] Filed: Oct. 5, 1988

[30] Foreign Application Priority Data

Oct. 14, 1987 [CA] Canada .................................. 549213

[51] Int. Cl.⁵ ............................................ A21D 13/00
[52] U.S. Cl. .................................... 426/242; 426/446; 426/549
[58] Field of Search ............... 426/559, 549, 242, 446, 426/458, 516

[56] References Cited

U.S. PATENT DOCUMENTS

| | | | |
|---|---|---|---|
| 2,868,647 | 1/1959 | Vollink | 426/302 |
| 3,027,258 | 3/1962 | Markakis et al. | 426/438 |
| 3,094,947 | 6/1963 | Green et al. | 426/307 |
| 3,150,978 | 9/1964 | Campfield | 426/439 |
| 3,246,990 | 4/1966 | Thompson et al. | 426/307 |
| 3,253,533 | 5/1966 | Benson | 99/443 R |
| 3,407,070 | 10/1968 | Murray et al. | 426/559 |
| 3,464,827 | 9/1969 | Tsuchiya et al. | 426/295 |
| 3,506,454 | 4/1970 | Reesman | 426/242 |
| 3,539,356 | 11/1970 | Benson et al. | 426/550 |
| 3,600,192 | 8/1971 | Tanaka et al. | 426/438 |
| 3,600,193 | 8/1971 | Glabe et al. | 426/555 |
| 3,652,294 | 3/1972 | Marotta et al. | 426/550 |
| 3,656,966 | 4/1972 | Ball et al. | 426/94 |
| 3,687,687 | 8/1972 | Liepa | 426/550 |
| 3,689,279 | 9/1972 | Bedenk | 426/452 |
| 3,703,379 | 11/1972 | Cummisford et al. | 426/242 |
| 3,704,133 | 11/1972 | Kracauer | 426/93 |
| 3,753,729 | 8/1973 | Harms et al. | 426/560 |
| 3,800,050 | 3/1974 | Popel | 426/448 |
| 3,814,822 | 6/1974 | Henthorn et al. | 426/73 |
| 3,849,582 | 11/1974 | Blagdon et al. | 426/550 |
| 3,851,081 | 11/1974 | Epstein | 426/448 |
| 3,876,811 | 4/1975 | Bonner et al. | 426/93 |
| 3,950,567 | 4/1976 | Tomlinson | 426/625 |
| 3,966,990 | 6/1976 | Cremer et al. | 426/446 |
| 3,983,256 | 9/1976 | Norris et al. | 426/94 |
| 4,178,392 | 12/1979 | Gobble et al. | 426/93 |
| 4,211,800 | 7/1980 | Scharschmidt et al. | 426/93 |
| 4,251,551 | 2/1981 | Van Hulle et al. | 426/242 |
| 4,409,250 | 10/1983 | Van Hulle et al. | 426/446 |
| 4,435,628 | 3/1984 | Bowen et al. | 426/243 |
| 4,477,705 | 10/1984 | Danley et al. | 219/10.55 E |

FOREIGN PATENT DOCUMENTS 1049556 11/1966 United Kingdom .
1524465 9/1978 United Kingdom .

Primary Examiner—George Yeung
Attorney, Agent, or Firm—Hill, Van Santen, Steadman & Simpson

[57] ABSTRACT

Half products expandable or puffable by microwave or convection heat energy are prepared by (a) preparing a starch-containing material having a moisture content of not more than about 25%, (b) extruding the moisture-tempered material at a temperature of about 80° to 110° C. without causing expansion thereby producing a hot melt in a rope or piece form, and (c) cooling the extrudate without substantially lowering the moisture content for a time necessary to harden up. The half-products contain not more than about 25% of moisture in a glass-like rope or piece form and are shelf stable without preservatives. Substantial savings can be achieved in manufacture, storage, shipping, and handling because of the low processing temperature and the storage stability of the dense and hard products.

22 Claims, No Drawings

MICROWAVE-PUFFABLE HALF-PRODUCTS OF STARCH-CONTAINING MATERIAL AND THEIR PRODUCTION PROCESS

FIELD OF THE INVENTION

The invention generally relates to expanded snack foods and in particular to a process for manufacturing unexpanded half-product employing an extruder and a subsequent production of expanded snack foods by exposing the half-product to microwave and/or convection heat energy.

DESCRIPTION OF THE PRIOR ART

Expanded snack foods are currently manufactured by several processes. Most expanded or puffed snacks are manufactured by a process known as extrusion cooking. In this process a starch-bearing material is mixed with water to a maximum moisture content of 30% and forced through a heated barrel by a helical screw towards a constriction or die. In transit, the starch becomes plastic and flows under pressure. Upon exiting from the die to atmospheric pressure, the sudden pressure reduction causes the rapid flashing-off of excess moisture with an accompanying expansion in product volume. The extent of volume expansion (bulk density), structural modification, product texture and functional characteristics can be controlled by the moisture content in the extrudate, speed and configuration of the screw and the amount of the heat applied externally to the barrel.

Alternatively, some snack products are made by expanding or "puffing" or what is known in the art as a "half-product". To prepare such a half-product, a starch-bearing material is either blended with a sufficient quantity of a precooked starch or is itself partially cooked and kneaded to form a dough-like mass. The mass is then formed or shaped without heating into dough pieces which are subsequently dried to lower the content of moisture from about 35% to about 8 to 10%, usually in a forced air convection tunnel dryer. The half-product is next puffed or expanded by causing the remaining moisture trapped within the pieces of the half-product to expand from the liquid state to the vapour phase by rapid heating or rapid depressurizing, which results in both cases in expansion of the half-product. The rapid heating is usually conducted by deep fat frying under high temperature-short time conditions or by heating in a convection oven. The rapid depressurizing technique is known as "gun puffing" and is commonly used to prepare ready-to-eat cereals. The whole cereal grains or preformed pieces of the half-product are rotated in a sealed, heated drum. As moisture is released from the pieces, the pressure in the drum increases. At the appropriate moment a pressure release gate is opened, the pressure in the drum drops rapidly to atmospheric pressure which causes the expansion of the particles.

The known processes of manufacturing of expanded snack foods require high energy inputs (mechanical, electrical, and thermal). It is estimated that energy accounts for around 30% of production costs. A substantial amount of this energy is lost as radiated heat. Moreover, the expansion by the deep fat frying results in a substantial absorption of fat by the product. In this case and also when flavor is developed by application of a fat-soluble flavoring, the caloric content of the product is increased. This contributes to the perception that snack foods consist of empty calories and are fattening.

Expanded products are packaged at point of manufacture and require warehousing prior to and following shipment at distribution centres. Some warehousing is also experienced at the retail level. Since most warehousing and shipping costs are expressed on a volume basis, handling of expanded products can be expensive. The number of different handling events may cause physical damage to the packaged product which detracts from its quality at the retail level. The shelf stability of such products particularly of deep fried snacks is also limited.

A method is known in which an extruder is employed for producing a half-product. Water is added to a starch-bearing material to an extent that water content reaches approximately from 35 to 45%. The resulting mixture is a dough which is then cooked in the barrel of the extruder. The cooked dough is extruded through a cooling end of the extruder in a form like spagetti. The wet extrudate is dried to a water content of about 10%. The drying typically takes about 24 hours and the temperature and the relative humidity must be very carefully controlled, otherwise uniformly puffable dried half-products cannot be produced. Another important disadvantage of this process is that the dimension of the half-product is restricted; namely, the thickness must be at most about 2mm in order to secure uniformly puffable half-products.

SUMMARY OF THE INVENTION

It has been found that these disadvantages may be reduced and eliminated by preparing a half-product by a low temperature extrusion of a starch mix having a predetermined moisture content. A starch melt produced in the process of extrusion hardens up into a densified, non-expanded, shelf stable half-product without the need for a drying step. This half-product can be expanded at will into a low density, ready-to-eat snack food by short exposure to microwave energy as the only heating source, to a convection heating, or to a combination of convection and microwave heating.

Thus, the present invention provides a process for manufacturing a half-product in a shelf stable, glass-like rope or piece form having a moisture content of not more than about 25% by weight, which half-product upon heating can be expanded into expanded snack foods, which process comprises the steps of:

a) providing a starch-containing material having a moisture content of not more than about 25%;

b) extruding the moisture-tempered material at a barrel temperature of from about 80° to 110° C. and at an extruder die temperature of less than 100° C. without causing any expansion, thereby producing a hot melt extrudate in a rope or piece form; and c) leaving the extrudate at room temperature, without substantially lowering the moisture content, for the time necessary to harden up, thereby producing the ready to be expanded half-product.

Alternatively to room temperature cooling, the hot melt extrudate may be subjected to assisted cooling such as is achievable with forced air, carbon dioxide or the like, as far as the moisture content is substantially maintained. According to another aspect of the invention there is provided a starch-based half-product in a shelf-stable glass-like rope or piece form having a moisture content of not more than about 25% by weight, which half-product upon heating with convection and- /or microwave energy can be expanded into expanded snack foods. According to still another aspect of the invention there is provided a process for manufacturing of expanded snack foods, which comprises the steps of:

(a) providing a starch-containing material having a moisture content of not more than about 25%;

(b) extruding the material at a barrel temperature of from about 80° to 110° C. and at an extruder die temperature of less than 100° C. without causing any expansion, thereby producing a hot melt extrudate in a rope or piece form;

(c) leaving the extrudate at room temperature or alternatively by force-cooling it, without substantially lowering the moisture content, for the time necessary to harden up, thereby producing a ready-to-be expanded half-product in a shelf-stable glass-like rope or piece form having a moisture content of not more than about 25% by weight; and (d) exposing the hardened extrudate to convection or microwave energy or a combination of both for the time necessary to expand the extrudate into expanded snack foods.

Preferably the extrudate is divided into discrete pieces of appropriate or selected length at the die face of the extruder and prior to hardening.

According to yet another aspect of the invention there is provided expanded snack foods produced by the above process.

DESCRIPTION OF THE PREFERRED EMBODIMENT

The possible raw, starch-containing materials generally include any cereal flour or starch or any root flour or starch without regard to starch composition. The flours should be composed of predominantly starch. Preferred raw materials useful in the present invention include cereal and root starches, oat and potato flour or any composite mixture thereof. These raw starch-containing materials usually have a moisture content of less than 14%, typically less than 12%. In our experimental runs, wheat starch, cornmeal, potato flour, wheat flour and substantially bran-free oat flour and a mixture (1:1) of potato flour and substantially bran-free oat flour were tested. All resulted in fairly good products, though the degree of puffing and the appearance vary to some extent reflecting the composition. It appears that certain types of flours containing a gluten type protein somewhat resist post-extrusion expansion. However, this does not necessarily mean that such flours are totally unsuitable or unacceptable to consumers.

Moisture-tempered material is usually prepared by admixing water and the starch-containing material. Where the starch-containing material has a relatively high moisture content, for example, about 14% and a high-powered extruder is employed, additional water may not be necessary. The water content in the moistened material should be kept in the range of not more than about 25%. In a preferred embodiment, the water content is 19 to 25%, particularly from 19 to 21%, by weight. In another preferred embodiment, particularly where a powerful extruder is employed, the water content may be from 12 to 19% by weight. This mixing, where necessary, can be carried out either outside the extruder, or if appropriately equipped, inside the extruder.

The moisture-tempered starch containing material is distinguished from a dough which is a moistened mass having a consistency high enough to be kneaded or rolled. The moisture-tempered material according to the invention is still granular or powdery even after the moisture tempering because of the relatively low moisture content (i.e., not more than 25%).

The moisture tempered starch material is heated within the extruder barrel at a temperature of from about 80° to about 110° C., preferably from about 100° to about 110° C. and then extruded from the extruder die at a temperature of less than 100° C, preferably about 60° to 70° C. It is under the influence of the extrusion conditions that the moistened starch-containing material becomes plastic within the extruder barrel. The type of extruder is not important according to the invention. Both single and double screw types can be employed. The extruder and/or its operation conditions should not be such that the extrudate expands on exit therefrom, because otherwise the products would not puff in a subsequent heating step.

If the above ranges of the process parameters are observed, an unexpanded starch melt produced in the process of extrusion hardens into a densified, glass-like (i.e., hard and transparent or translucent) half-product within approximately 1 hour of exit from the extruder at room temperature, without substantially lowering the moisture content.

The half-product so obtained has a water activity less than 0.6 and is shelf stable for greater than twelve months without requiring an added preservative. The inventors suppose that this is because the water is locked up among the starch molecules due to the shear stress and pressure applied within the extruder before extrusion. The appearance of the half product does not change after an extended period of storage. Loss of a very slight amount of moisture (i.e., less than 0.5% over 9 months) was observed, but this did not result in lower puffabilities at all. No further drying of this half-product is required in order to expand it by exposing it to thermal energy or electromagnetic radiation.

Since the process for preparing the half-product is carried out under relatively low temperatures (i.e., 80° to 110° C. in the barrel and less than 100° C at the die) and no drying step is necessary, substantial savings in the energy costs are achieved. In addition, because no drying step is required, the half-product of the invention does not have any specific restriction as to the dimension or size. From the view point of consumer acceptability, a half-product of any desired cross-sectional area and shape defined by the die and having a thickness of more than 2 mm up to about 5 cm, particularly from about 5 mm up to about 2 cm would be preferable.

Both the temperature at which the starch material is extruded and the upper limit of the moisture content are crucial according to the invention. If the moisture content is over 25%, the hot melt extrudate does not harden up into a glass-like solid shape. On the other hand, if the moisture content is too low depending on the type of extruder, etc., it seems to create an unfavorable condition to extrude at the exit. If the extrusion temperature is over 110° C., the moisture is driven off at the exit and the moistened material tends to expand at the exit. On the other hand, if the extrusion temperature is below 80° C., it does not create the conditions to cause the moistened material to melt and flow in the extruder.

Prior to hardening up, the hot extrudate may be coated with flavor and/or taste improving or imparting compositions, e.g. sugar-containing compositions.

The exposing of the half-product to convection and/or microwave energy may occur using any suitable devices such as for instance, a continuous waveguide, a consumer microwave, a normal consumer oven, or convection/microwave oven unit. The time of exposure necessary to expand the half-products depends on the power of the oven unit and on the quantity of material exposed. In our experience 25 g of half-product was expanded in 90s in a 700 w microwave oven.

It should be noted that the half products of this invention do not puff when subjected to deep-fat frying in contrast to other art.

While conducting the process of the invention it is possible to manufacture only the intermediate half-product at a central facility and distribute the dense, robust solid half-product to locations closer to the market place where a microwave expanding line could be used to produce the finished product. Alternatively, the divided half-product might be appropriately packaged and sold to consumers and expanded in consumers' individual microwave ovens. In any case substantial savings in storage, shipping and handling costs can be achieved as well as reducing the breakage factor associated with multiple handling of a brittle product.

For a better understanding of the present invention, the following examples are presented. It should be noted however, that these are examples only and should not be considered as limiting the invention.

EXAMPLE 1

6000 g wheat starch (moisture content, 11.8%) were tempered with 616 g water in a Paterson 'V' blender until the equilibrium moisture content had reached 20.2%. The moistened powder was passed through a 25 mesh s.s screen and continuously fed, via a small vibratory feeder, to a Brabender laboratory extruder. The extruder barrel had a L/D ratio of 20:1 and was fitted with a ¼" cylindrical die and a 5:1 compression ratio tapered screw. The moistened powder was fed to the extruder by a custom-built paddle feeder as described in Timbers et al (CIFST J. (1976) 9(4): 232).

The temperature profile on the extruder barrel upon start up was:
Zone 1—feed zone—ambient temperature (23°-25° C.)
Zone 2—metering zone—65° C.
Zone 3—die block—65° C.
The extruder was operated at a screw speed of 80 rpm.

When the product appeared at the die face, the temperature in Zone 2 was raised to 107° C. When steady state conditions were established, the nominal operating pressure in Zone 2 was 4300 psig and 1400 psig at die. The half product extrudate had the appearance of a semi-translucent unexpanded rope which on cooling to ambient temperature, hardened into a dense material of high tensile strength. Prior to setting, the rope was cut in ½" long pieces and 25 g of such pieces, upon hardening, were expanded in a microwave oven for 90 s at 700 W of power to give snack-like puffs of density 0.16 g/cm$^3$. The density of the unexpanded pieces was 1.22 g/cm$^3$. It was also possible to coat the unexpanded pieces in a flavored sucrose powder prior to expansion to give a sweetened expanded product.

EXAMPLE 2

60 g of commercial potato granules (6.8% H$_2$O) were adjusted with 990 g of water to an equilibrated moisture content of 20.6% and extruded as described in Example 1. The nominal operating pressures in Zones 2 and 3 were 5000 psig and 1400 psig respectively. The density of the half product was 1.39 g/cm$^3$. Upon expansion by microwave treatment, the puffed product was found to have a density of 0.186 g/cm$^3$.

EXAMPLE 3

6000 g of a substantially bran-free oat flour (7.3% H$_2$O content) such as may be produced by the process according to Canadian Patent No. 1,179,189 (corresponding to U.S. Pat. No. 4,435,429) to Burrows et al were tempered to an equilibrated moisture content of 20.2% with 1028 g of added water. The moistened flour was extruded as described in Example 1. The nominal operating pressures in Zones 2 and 3 were 960 and 1300 psig respectively. The unexpanded half-product had a density of 1.54 g/cm$^3$. Upon expansion by microwave treatment, the puffed product had a density of 0.326 g/cm$^3$.

EXAMPLE 4

3000 g of oat flour as described in Example 3 (20.2% moisture content) and potato flour (20.6% moisture content) were blended to obtain a co-blend and extruded as described in Example 1. The nominal operating pressures in Zones 2 and 3 were 2680 and 1100 psig respectively. The unexpanded half-product had a density of 1.43 g/cm$^3$. Upon microwave expansion, the puffed product had a density of 0.194 g/cm$^3$.

What is claimed is:

1. A process for manufacturing a shelf-stable hard densified transparent or translucent half-product in a rope or piece form having a moisture content of more than 14% but not more than 25% by weight, the half-product being expandable into expanded snack foods upon heating by at least a consumer microwave oven, a consumer oven or a consumer convection/microwave oven comprising the steps of:
   (a) providing a material being comprised predominantly of starch and having a moisture content of more than 14% but not more than about 25% by weight, wherein the moisture content is the total amount of water usually naturally contained in a raw material comprised predominantly of starch, and water which may have to be added when the raw material does not contain the required amount of water;
   (b) extruding the starch-containing material at a barrel temperature from approximately 80° to about 110° C. and at an extruder die temperature of less than 100° C. without causing any expansion, thereby producing a hot melt extrudate of the material in a rope or piece form; and
   (c) cooling the extrudate thereby causing the extrudate to harden without substantially lowering the moisture content, thereby producing the shelf-stable ready-to-be expanded half-product.

2. A process according to claim 1, wherein: the starch-containing material is granular or powdery and is prepared in a step (a) by adding an appropriate amount of water to a raw starch-containing material having a moisture content of less than 14% and the granular or powdery moisture-tempered material is made plastic in the barrel of the extruder at 80° to 110° C. before extruded from the extruder in step (b).

3. A process according to claim 2 wherein the extrudate is divided into a plurality of pieces of desired shape and dimensions.

4. A process according to claim 2, wherein the barrel temperature of the moisture-tempered material is from about 100° to about 110° C.

5. A process according to claim 2, wherein the moisture content of the moisture-tempered material, and of the half-product is from 19 to 25%.

6. A process according to claim 2, wherein the moisture-tempered material is extrudated at an extruder die temperature of from 60° to 70° C.

7. A process according to claim 2, wherein the barrel temperature of the moisture-tempered material is from about 100° to about 110° C. and the moisture content of the moisture-tempered material and of the half-product is from 19 to 21%.

8. A process according to claim 2, wherein the moisture tempered material is extrudated at an extruder die temperature of from 60° to 70° C. and the moisture content of the moisture-tempered material and of the half-product is from 19 to 21%.

9. The process of claim 1 wherein the extrudate is cooled by leaving the extrudate at room temperature.

10. The process of claim 1 wherein the extrudate is cooled by force cooling it.

11. A process for manufacturing a shelf-stable hard densified transparent or translucent starch-based half-product in rope or piece form having a moisture content of more than about 14% but not more than about 25% by weight, the half-product being expanded into expanded snack food upon heating by at least a consumer microwave oven, a consumer oven or a consumer convection/microwave oven, the process comprising the steps of:
 (a) adding an appropriate amount of water to a raw material comprised predominantly of starch and having a moisture content of less than 14% by weight, thereby obtaining a starch-containing material having a moisture content of more than approximately 14 to not more than 25% by weight;
 (b) heating the moisture tempered starch-containing material in an extruder barrel at a temperature of from approximately 80° to 110° C. and extruding the heated starch-containing material at an extruder die temperature of at least 60° but less than 100° C. without causing expansion, thereby producing a hot melt extrudate of the material in a rope or piece form; and
 (c) cooling the extrudate and thereby causing it to harden without substantially lowering the moisture content, thereby producing the shelf-stable ready-to-be expanded half-product.

12. A process according to claim 11, wherein the moisture content of the moisture-tempered material and of the half-product is from about 19 to 21%.

13. A process according to claim 11, wherein the raw material is cereal or root starch.

14. A process according to claim 11, wherein the raw material is flour selected from the group consisting of cornmeal, potato, wheat, substantially bran-free oat and mixture thereof.

15. The process of claim 11 wherein the extrudate is cooled by leaving the extrudate at room temperature.

16. The process of claim 11 wherein the extrudate is cooled by force cooling it.

17. A process for manufacture of expanded snack food, comprising the steps of:
 (a) providing a material being comprised predominantly of starch and having a moisture content of more than 14 but not more than about 25%;
 (b) heating the material at a barrel temperature of approximately 80° to about 110° C. in an extruder and extruding the material at an extruder die temperature of less than 100° C. without causing expansion, thereby producing a hot melt extrudate in a rope or piece form;
 (c) cooling the extrudate and causing the extrudate to harden up, without substantially lowering the moisture content and thereby producing a shelf-stable hard densified transparent or translucent ready-to-be expanded half-product having a moisture content of more than 14 but not more than about 25% by weight; and
 (d) exposing the hardened extrudate to microwave or convection energy for a time necessary to expand the hardened half-product into expanded snack foods.

18. A process according to claim 17, wherein: the starch-containing material having a moisture content of from about 14 to 25% is granular or powdery and is prepared by adding an appropriate amount of water to a raw starch-containing material having a moisture content of less than 14% in step (a); and the granular or powdery moisture-tempered material is made plastic in a barrel of the extruder at 80° to 110° C. before being extruded from the extruder die in step (b).

19. A process according to claim 18 wherein the half-product is divided into a plurality of pieces of desired cross-sectional area and shape having a thickness of more than 2 mm up to 5 cm.

20. A process according to claim 18, wherein the half-product is stored before being exposed to the convection or microwave energy.

21. The process of claim 17 wherein the extrudate is cooled by leaving the extrudate at room temperature.

22. The process of claim 17 wherein the extrudate is cooled by force cooling it.

* * * * *